US010578205B2

(12) United States Patent
Rakuff et al.

(10) Patent No.: US 10,578,205 B2
(45) Date of Patent: Mar. 3, 2020

(54) MACHINE AND GEARBOX SYSTEM WITH AIR COOLING

(71) Applicant: ABB Schweiz AG, Baden (CH)

(72) Inventors: Stefan Rakuff, Windsor, CT (US); Gregory F. Rossano, Enfield, CT (US); Joe J. Liou, Windsor, CT (US); Qimin Dong, Greer, SC (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/994,456

(22) Filed: May 31, 2018

(65) Prior Publication Data

US 2019/0368596 A1    Dec. 5, 2019

(51) Int. Cl.
*F16H 57/04* (2010.01)
*F04D 29/42* (2006.01)
(Continued)

(52) U.S. Cl.
CPC ..... *F16H 57/0416* (2013.01); *F04D 29/4226* (2013.01); *F04D 29/441* (2013.01);
(Continued)

(58) Field of Classification Search
CPC ........ F16H 57/027; F16H 57/03; F16H 57/04; F16H 57/0412; F16H 57/0416; F16H 2057/02026; F16H 57/0415; F16H 41/30; F16H 57/025; F16H 2057/02073; F04D 29/441; F04D 29/4226; F04D 29/541;
(Continued)

(56) References Cited

U.S. PATENT DOCUMENTS

| 3,226,580 A | 12/1965 | Oehlrich et al. |
| 9,756,759 B2 * | 9/2017 | Kimura ............... F16H 57/0416 |
| 2017/0211478 A1 * | 7/2017 | Storage ..................... F02C 7/14 |

FOREIGN PATENT DOCUMENTS

| DE | 1715971 U | 2/1956 |
| DE | 1298819 B | 7/1969 |

(Continued)

OTHER PUBLICATIONS

European Patent Office, Extended European Search Report in corresponding application No. 19177705.1, dated Oct. 22, 2019, 14 pp.

*Primary Examiner* — Jeremy R Severson
(74) *Attorney, Agent, or Firm* — Taft Stettinius & Hollister LLP; J. Bruce Schelkopf (57) ABSTRACT

A system includes a machine having an external surface and a shaft extending from a first side of the machine; a cooling airflow generator mounted on the shaft and operative to generate a cooling airflow for cooling the machine; a flow guide structure constructed to receive the cooling airflow from the cooling airflow generator and to direct the cooling airflow received from the cooling airflow generator across the external surface; and a scavenge scoop spaced apart from the flow guide structure and disposed at a second side of the machine opposite the first side, wherein the external surface is disposed between the scavenge scoop and the flow guide structure, and wherein the scavenge scoop is constructed to collect a portion of the cooling airflow generated by the cooling airflow generator and direct the a portion of the cooling airflow across a portion of the second side of the machine.

20 Claims, 8 Drawing Sheets

(51) Int. Cl.
*F04D 29/44* (2006.01)
*F04D 29/54* (2006.01)
*F16H 57/02* (2012.01)

(52) U.S. Cl.
CPC .... *F04D 29/541* (2013.01); *F05B 2260/2241* (2013.01); *F16H 2057/02026* (2013.01); *Y10T 74/2189* (2015.01)

(58) Field of Classification Search
CPC ......... F05B 2260/2241; Y10T 74/2189; F16D 2300/0212
See application file for complete search history.

(56) References Cited

FOREIGN PATENT DOCUMENTS

| | | | |
|---|---|---|---|
| JP | 2002218704 | A | 8/2002 |
| WO | 2014155452 | A1 | 10/2014 |

\* cited by examiner

MACHINE AND GEARBOX SYSTEM WITH AIR COOLING

TECHNICAL FIELD

The present application relates generally to machine systems, and more particularly, but not exclusively, to machine and gearbox systems having air-cooling.

BACKGROUND

Machine systems, such as gearbox or other machine systems, remain an area of interest. Some existing systems have various shortcomings, drawbacks and disadvantages relative to certain applications. For example, some machine systems have a limited ability to remove heat generated during operation of the machine. Accordingly, there remains a need for further contributions in this area of technology.

SUMMARY

One embodiment of the present invention is a unique system having a machine. Another embodiment is a unique system having a gearbox. Other embodiments include apparatuses, systems, devices, hardware, methods, and combinations for machines and gearboxes. Further embodiments, forms, features, aspects, benefits, and advantages of the present application shall become apparent from the description and figures provided herewith.

BRIEF DESCRIPTION OF THE FIGURES

The description herein makes reference to the accompanying drawings wherein like reference numerals refer to like parts throughout the several views, and wherein.

DETAILED DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1:
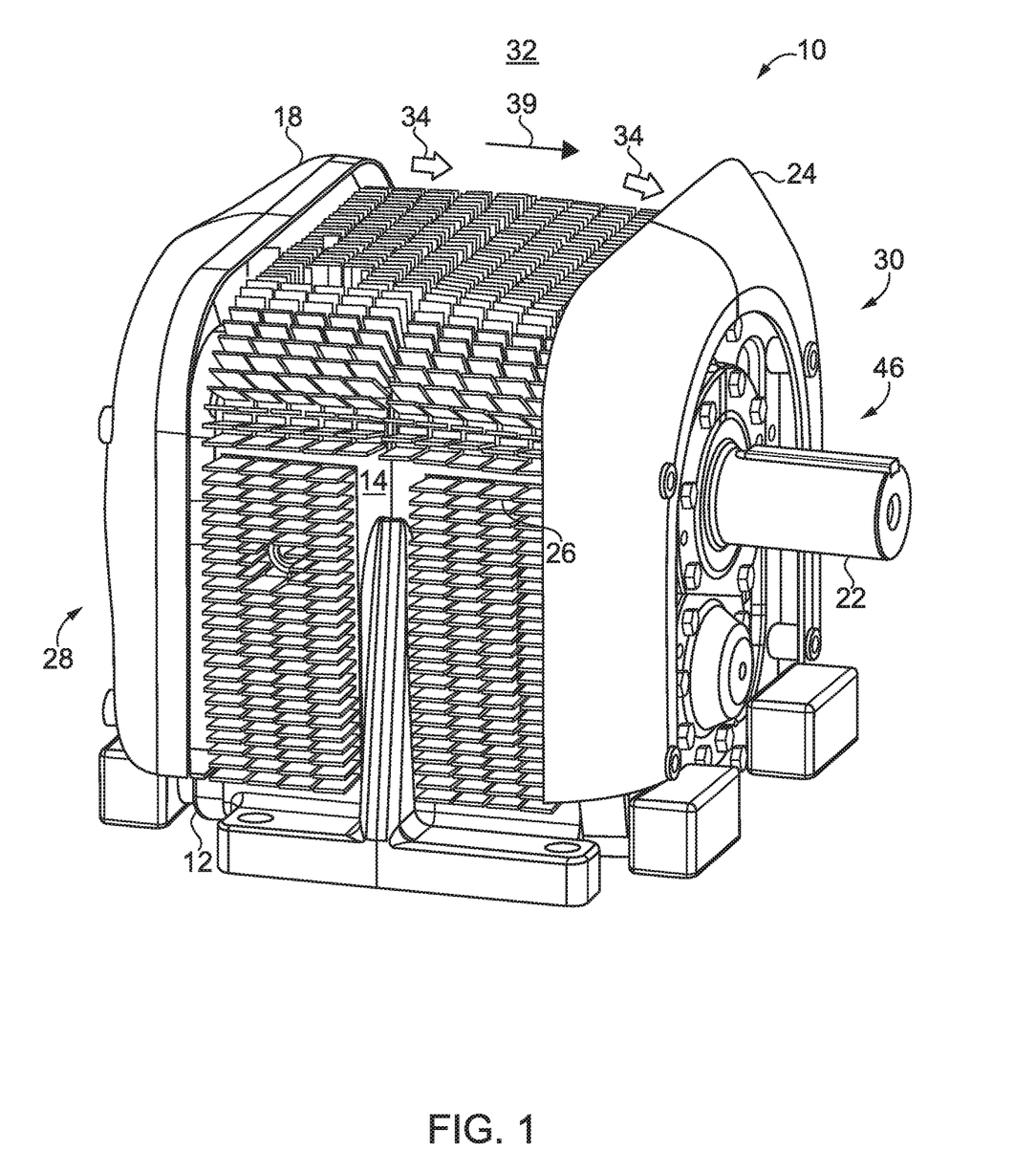
FIG. 1 illustrates some aspects of a non-limiting example of a machine system in accordance with an embodiment of the present invention.
Figure 2:
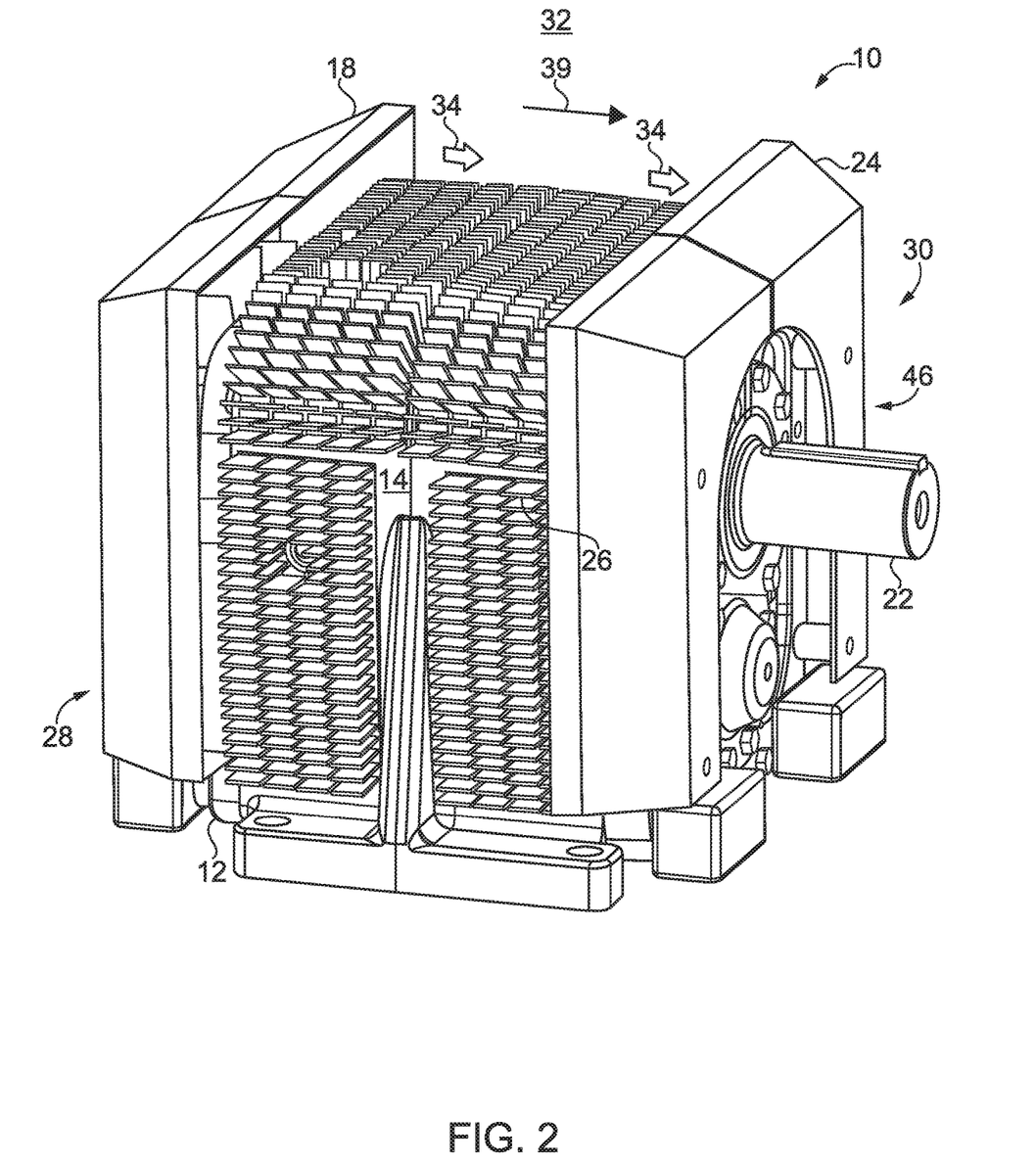
FIG. 2 illustrates some aspects of a non-limiting example of a machine system in accordance with an embodiment of the present invention.
Figure 3:
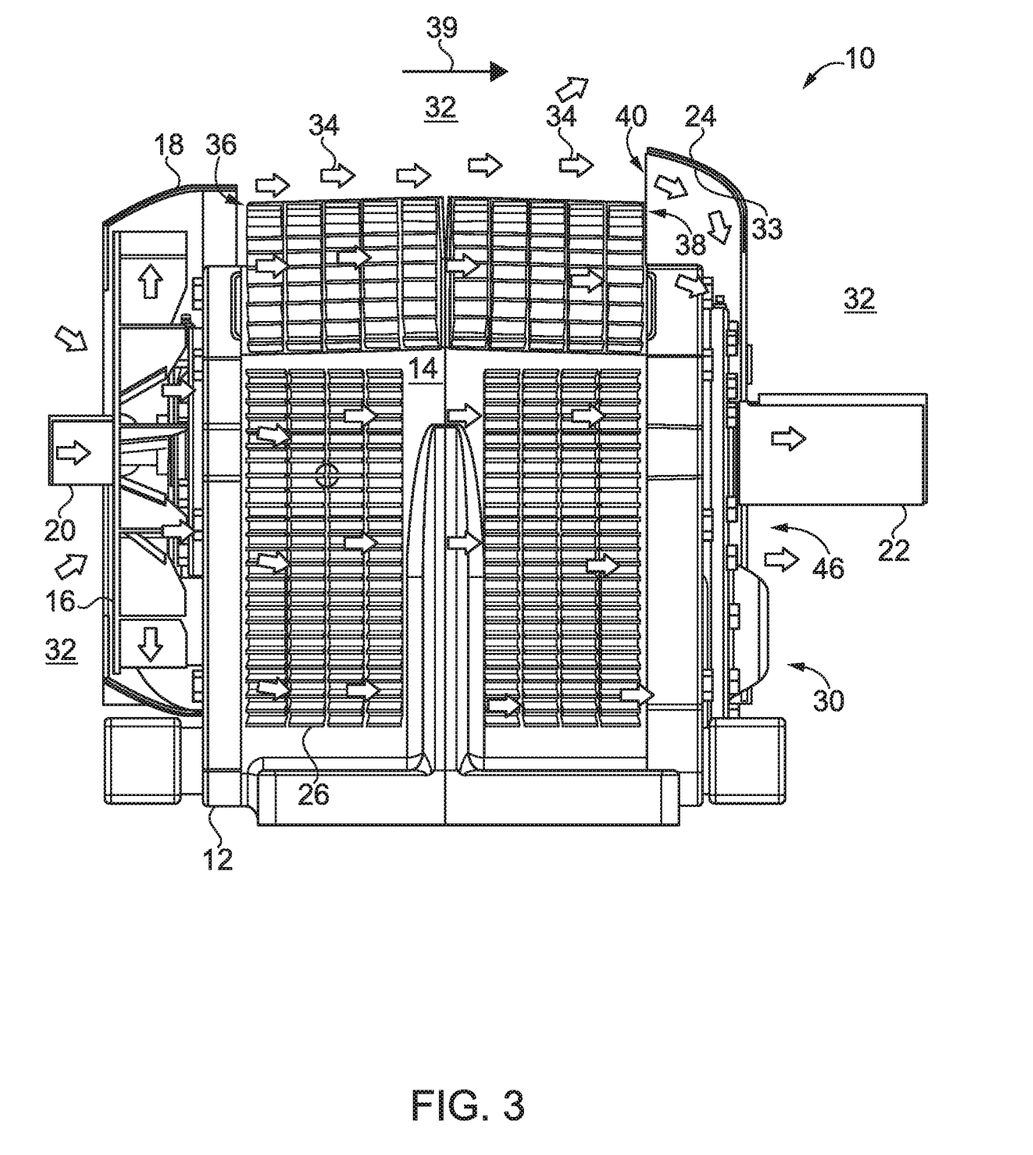
FIG. 3 is a partial cut-away view illustrating some aspects of a non-limiting example of the machine system of FIG. 1 in accordance with an embodiment of the present invention.
Figure 4:
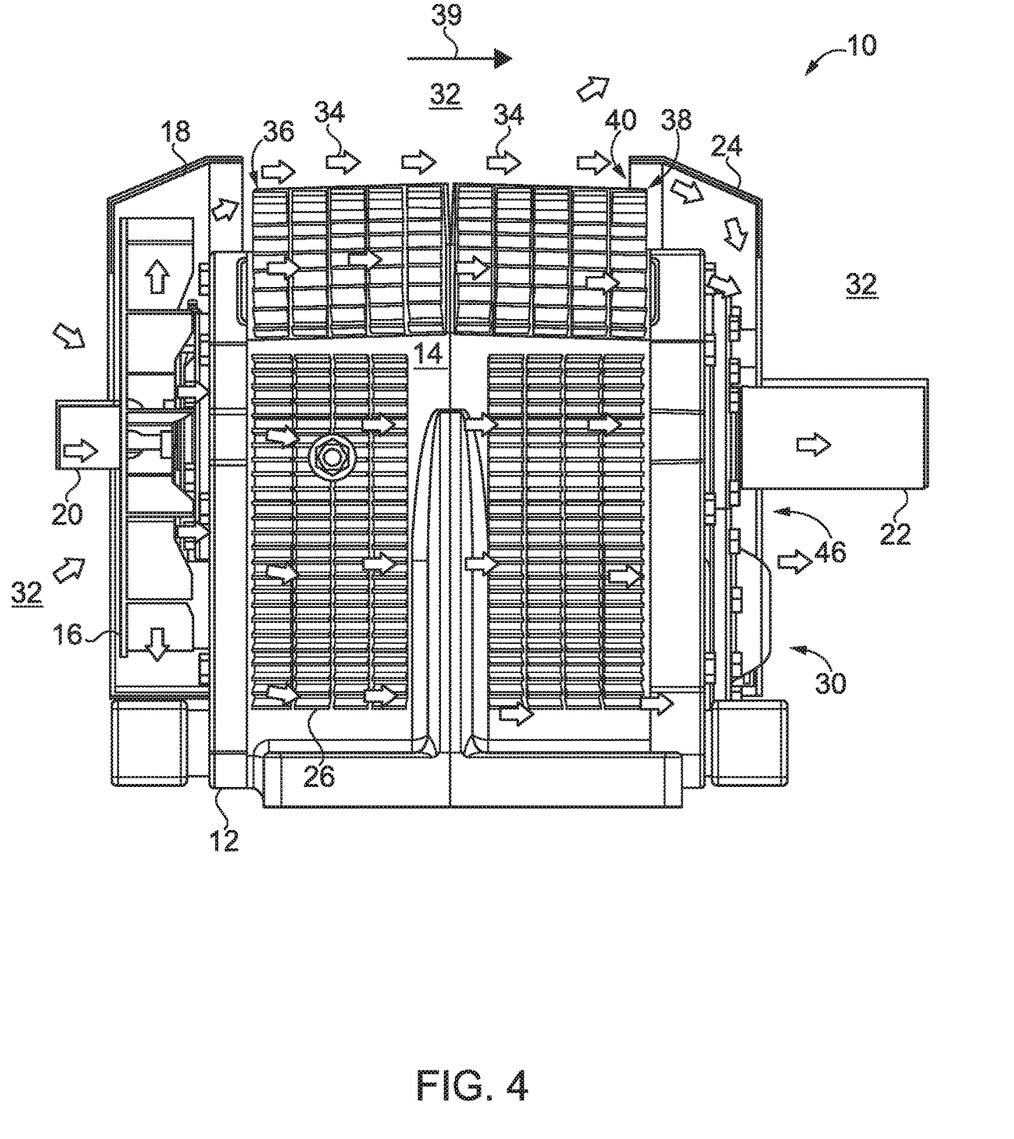
FIG. 4 is a partial cut-away view illustrating some aspects of a non-limiting example of the machine system of FIG. 2 in accordance with an embodiment of the present invention.

Referring to FIGS. 1-4, some aspects of non-limiting examples of a machine system 10 accordance with an embodiment of the present invention are illustrated. FIG. 1 depicts an embodiment, and FIG. 2 depicts another embodiment, wherein a scavenge scoop (described below) has a different shape than that of FIG. 1. FIG. 3 illustrates a partial cut-away view of the embodiment of FIG. 1; and FIG. 4 illustrates a partial cut-away view of the embodiment of FIG. 3.

Machine system 10 includes a machine in the form of a gearbox 12. In other embodiments, the machine may be another type of machine. For example, in some embodiments, the machine may be an electrical machine, such as a motor, generator or motor/generator in addition to or in place of a gearbox. In one form, gearbox 12 is a gear reducer, i.e., a speed-reducing gearbox. In other embodiments, gearbox 12 may be a speed-increasing gearbox. In yet other embodiments gearbox 12 may be another type of gearbox.

Gearbox 12 has an external surface 14. Machine system 10 includes a cooling airflow generator 16, a shroud 18, and a scavenge scoop 24. Gearbox 12 includes a first shaft or an input shaft 20 and a second shaft or an output shaft 22. In one form, external surface 14 includes a plurality of cooling fins 26. In other embodiments, external surface 14 may include other heat transfer features, e.g., pin fins or other features that increase convective heat transfer from external surface 14. In still other embodiments, external surface 14 may not include any fins, pin fins or other surface features that increase convective heat transfer. Input shaft 20 extends from an input face or side 28 of gearbox 12. Output shaft 22 extends from an output face or side 30 of gearbox 12. Side 30 spaced apart from side 28. In some embodiments, side 30 is opposite from and is parallel or substantially parallel to side 28. As a gear reducer, the rotational speed of output shaft 22 is less than the rotational speed of input shaft 20. In one form, output shaft 22 is operative to rotate in proportion to a rotation of input shaft 20.

In various embodiments, cooling airflow generator 16 is mounted on or coupled to input shaft 20. Input shaft 20 is operative to rotate cooling airflow generator 16. In other embodiments, cooling airflow generator 16 may alternatively be powered by another shaft, drive system or motor. In one form, cooling airflow generator 16 is a fan, e.g., a radial or centrifugal fan, and/or an axial fan or an impeller. In other embodiments, cooling airflow generator 16 may take other forms. Cooling airflow generator 16 is constructed to, when rotated, draw in air from the environment 32 in which gearbox 12 is located, and generate a cooling airflow 34 using the air drawn in from environment 32. Cooling airflow generator 16 is operative to supply cooling airflow 34 from side 28 for cooling gearbox 12, i.e., to supply cooling airflow 34 for cooling gearbox 12 using air drawn from the environment 32 in the vicinity of side 28 by cooling airflow generator 16.

Shroud 18 is in fluid communication with cooling air generator 16. Shroud 18 is constructed to receive the cooling airflow 34 from cooling air generator 16, and to direct the cooling airflow 34 received from cooling airflow generator 16 across a portion of side 28 of gearbox 12 and subsequently in a direction 39 across external surface 14, e.g., an axial direction, and to extract heat from external surface 14 by convection, thereby cooling gearbox 12. Shroud 18 extends beyond external surface 14, e.g., and beyond cooling fins 26 as well, for embodiments so equipped.

Scavenge scoop 24 is spaced apart from shroud 18 by external surface 14 (and cooling fins 26, for embodiments so equipped), and is disposed at side 30 of gearbox 12 opposite to side 28 and opposite to shroud 18. External surface 14 has an end 36 disposed proximate to the side 28, and has an end 38 opposite and spaced apart from end 36. End 38 is disposed proximate to side 30. Shroud 18 is disposed proximate to end 36 of external surface 14. Scavenge scoop 24 is disposed proximate to end 38 of external surface 14, and in particular, has an inlet 40 disposed proximate to the end 38. External surface 14 is disposed or is predominantly disposed between scavenge scoop 24 and shroud 18.

Scavenge scoop 24 is constructed to collect at least a portion of the cooling airflow 34 generated by cooling airflow generator 16 and discharged from shroud 18, and to direct this portion of the cooling airflow 34 across side 30 of gearbox 12 or at least a portion of side 30. In particular, inlet 40 of scavenge scoop 24 is constructed to collect at least a portion of cooling airflow 34 after the cooling airflow 34 has passed over external surface 14 (and over/through cooling fins 26 in embodiments so equipped) unbounded. By "unbounded," it is meant that cooling airflow 34 is not bounded or constrained or guided by a surface or flow guide structure as it flows between shroud 18 and scavenge scoop 24, and flows over and cools external surface 14 or most of external surface 14 (and cooling fins 26 in embodiments so equipped), prior to being collected or captured by scavenge scoop 24. For example, in FIGS. 1-8, cooling airflow 34 is unbounded as it travels across external surface 14 and cooling fins 26 between shroud 18 and scavenge scoop 24.

In order to facilitate collecting the cooling airflow 34, scavenge scoop 24 extends beyond the top surface and fore and aft portions of external surface 14 and cooling fins 26 of gearbox 12 (e.g., as depicted in the illustrations of FIGS. 1-4), and in some embodiments, more so than shroud 18 extends beyond those portions of external surface 14, e.g., as illustrated in FIGS. 1 and 3.

In some embodiments, scavenger scoop 24 is also constructed to direct this portion of cooling airflow 34 over output shaft 22. Scavenge scoop 24 is thus shaped to facilitate a redirection of cooling airflow 34 across output face or side 30 and output shaft 22. In the embodiment illustrated in FIGS. 1 and 3, scavenge scoop 24 employs a curved surface to smoothly transition the cooling airflow from an axial direction 39 across external surface 14 to a radially inward direction across side 30 and then axially outward and along output shaft 22. The embodiment illustrated in FIGS. 2 and 4 accomplishes the same or similar redirection of cooling airflow 34 using a scavenge scoop 24 having cylindrical, conical and flat sections. In some embodiments, output shaft 22 carries a large gear that makes contact with sump oil in gearbox 12. Directing cooling airflow 34 across output shaft 22 thus effectively transfers heat from inside gearbox 12 to the environment 32 outside gearbox 12.

The embodiment of FIGS. 1 and 3 include a scavenge scoop 24 having a concave cross-section, e.g., a concave portion 33 that is concave toward external surface 14 and side 30, e.g., when viewed in a plane aligned with input shaft 20 and/or output shaft 22 (e.g., a plane parallel to axial direction 39). The embodiment of FIGS. 2 and 4 include a scavenge scoop 24 having a substantially effective concave cross-section toward external surface 14 and side 30 when viewed in a plane aligned with input shaft 20 and/or output shaft 22. The concave or substantially effectively concave shapes of scavenge scoop 24 decreases the cross-sectional flow area in the flow direction, and accelerates the cooling airflow 34 collected by scavenge scoop 24, which increases the convective heat transfer from side 30 and output shaft 22.

Figure 5:
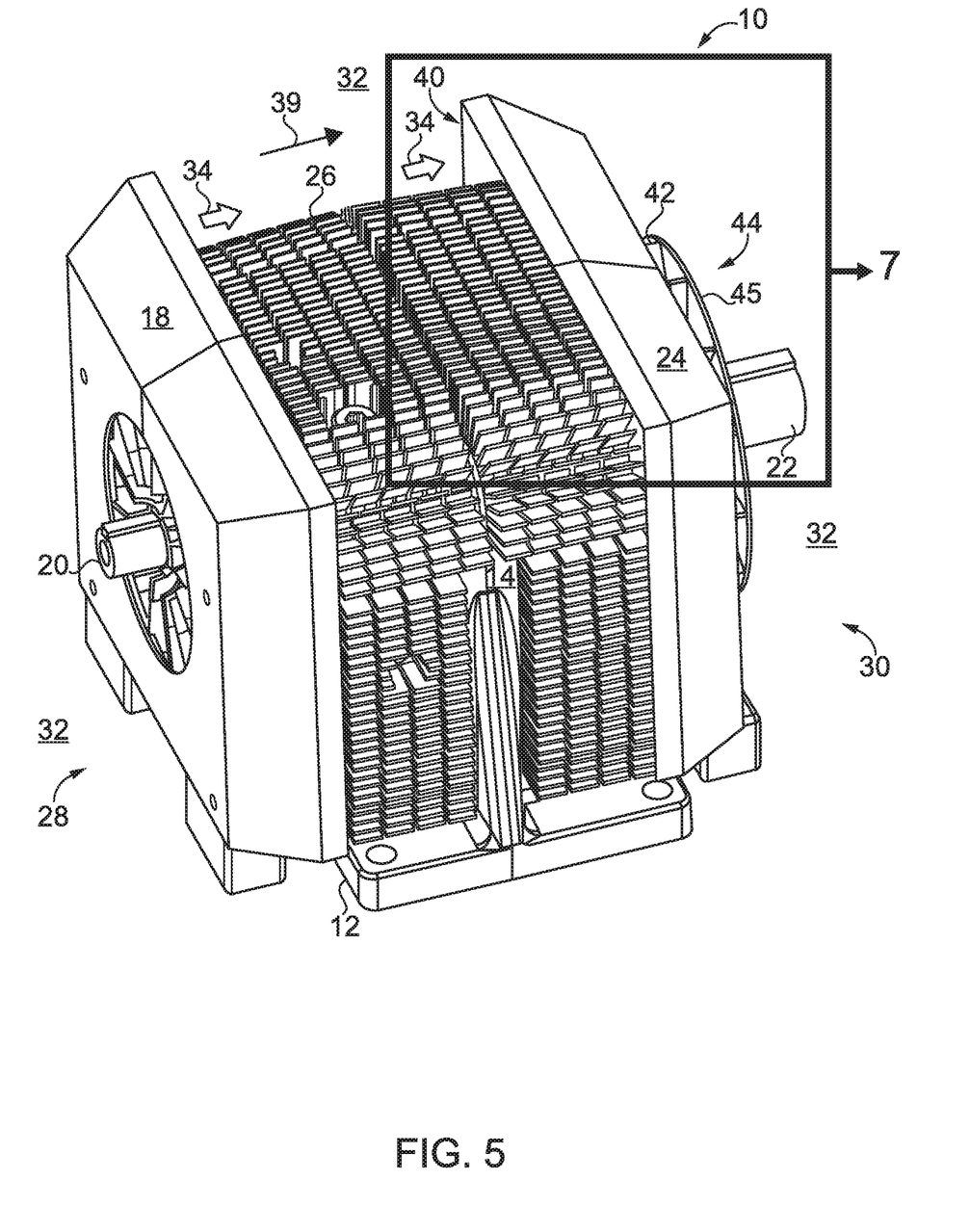
FIG. 5 is a perspective view illustrating some aspects of a non-limiting example of a machine system in accordance with an embodiment of the present invention.
Figure 6:
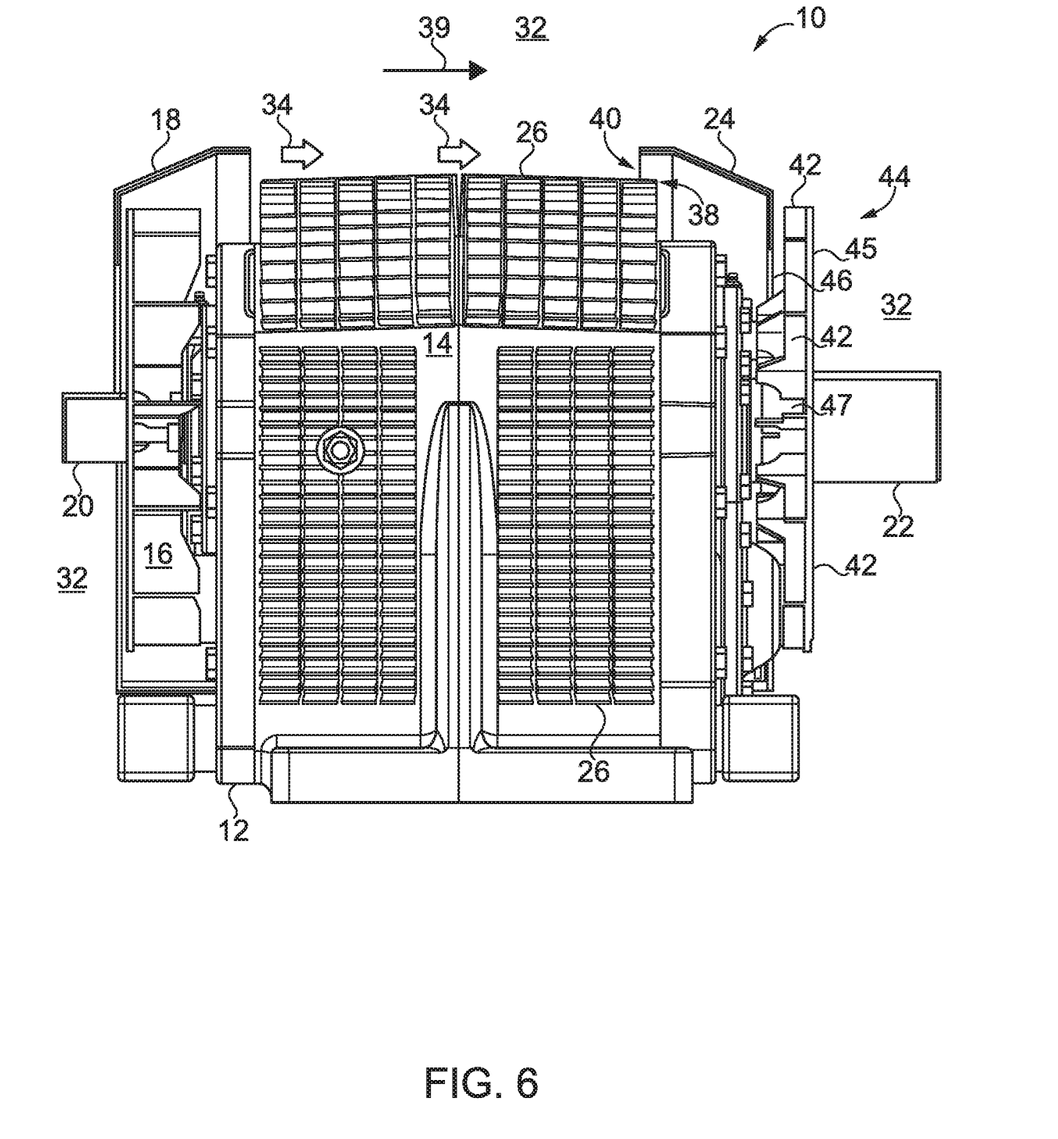
FIG. 6 is a partial cut-away view illustrating some aspects of a non-limiting example of the machine system of FIG. 5 in accordance with an embodiment of the present invention.
Figure 7:
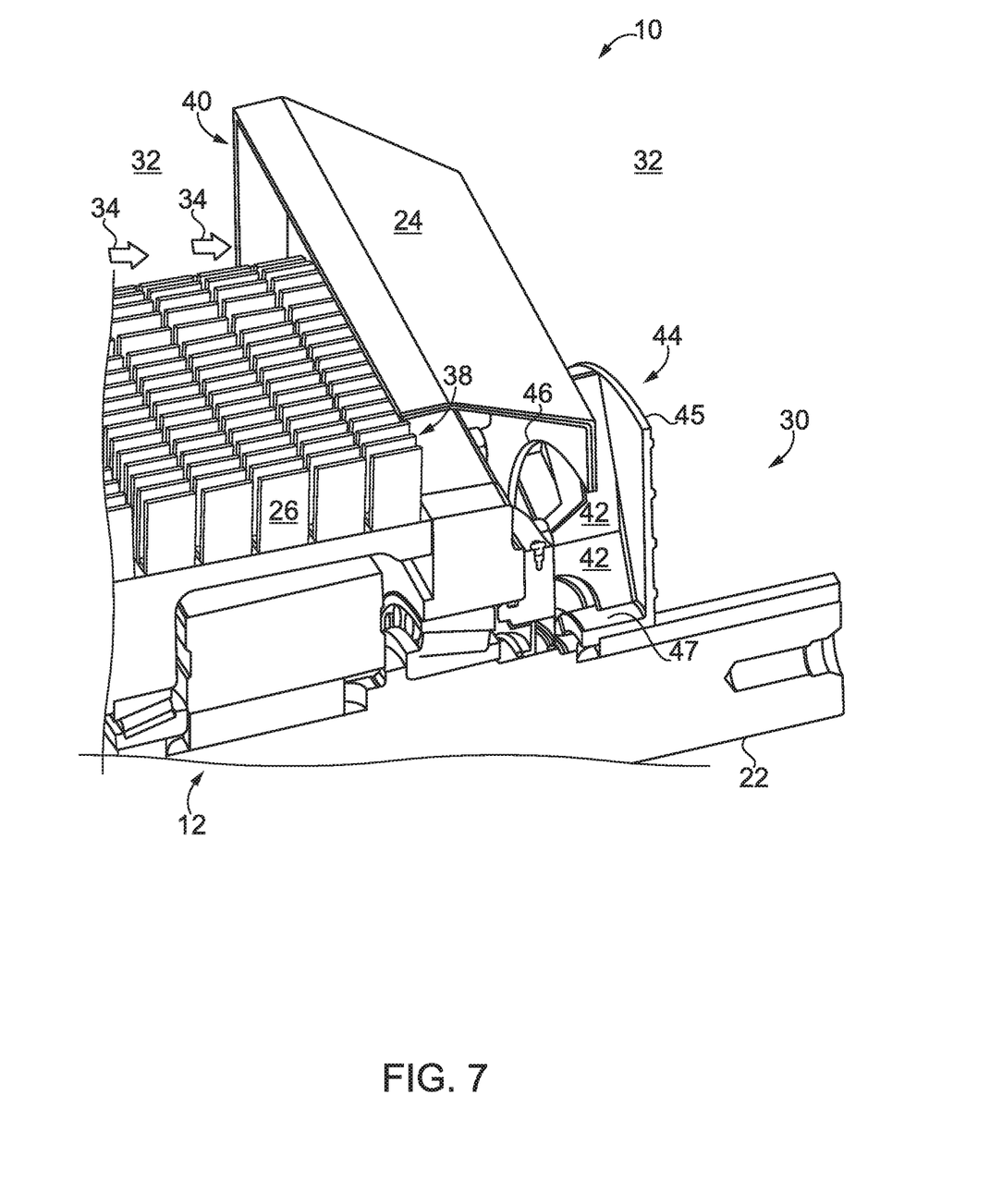
FIG. 7 is a partial cross-sectional view illustrating some aspects of a non-limiting example of the machine system of FIG. 5 in accordance with an embodiment of the present invention.

Referring also to FIGS. 5-7, some aspects of a non-limiting example of another embodiment of machine system 10 are illustrated in accordance with an embodiment of the present invention. FIG. 5 illustrates a perspective view; FIG. 6 illustrates a partial cut-away view; and FIG. 7 illustrates a partial cross-sectional view. In the embodiment of FIGS. 5-7, machine system 10 includes a plurality of rotating suctioning fin blades 42 mounted on output shaft 22. Rotating suctioning fin blades 42 are in thermal engagement with output shaft 22. For example, in some embodiments, rotating suctioning fin blades 42 are integrally formed or affixed together, and are mounted on output shaft 22 with an interference fit or a taper fit. Rotating suctioning fin blades 42 are constructed to increase the convective surface area of output shaft 22, and to draw cooling air through rotating suctioning fin blades 42, and in some embodiments, e.g., as described herein, through scavenge scoop 24, and discharge the cooling air outside of gearbox 12. Rotating suctioning fin blades 42 are referred to as "fins" because they are constructed as and function as cooling fins, conducting heat away from output shaft 22 and convecting the heat to cooling air. Rotating suctioning fin blades 42 are referred to as 'rotating' and 'suctioning' fins because they are constructed to cooperate to generate a suction when rotated together, e.g., as a unit. Rotating suctioning fin blades 42 are referred to as 'blades' because they form the blades of a fan or impeller that impart motion to a fluid such as air, to generate an airflow, e.g., wherein the fan or impeller is a radial fan or impeller in some embodiments, or an axial fan or combined axial/radial fan in other embodiments.

Rotating suctioning fin blades 42 are constructed to extract heat from output shaft 22 via conduction, and to transfer the heat to the environment 32 in which gearbox 12 is located by convection. In one form, rotating suctioning fin blades 42 are oriented along the axis of output shaft 22 (i.e., wherein the base of each rotating suctioning fin blade 42 extends in an axial direction, e.g., direction 39, along the axis of rotation of output shaft 22). In other embodiments, rotating suctioning fin blades 42 may be oriented differently. In one form, rotating suctioning fin blades 42 extend in the axial direction 39, and in the radial direction, i.e., radially outward from output shaft 22. In other embodiments, rotating suctioning fin blades 42 may also extend in other directions, e.g., in the circumferential direction.

Rotating suctioning fin blades 42 are constructed to cooperate to form a fan 44, e.g., a fan, e.g., a radial or centrifugal fan, and/or an axial fan or an impeller. In some embodiments, fan 44 may include a back plate 45 and a hub ring 47 that secure rotating suctioning fin blades 42 together. In some embodiments, back plate 45 and hub ring 47 may be integral with rotating suctioning fin blades 42, yielding fan 44 as an integral unitary structure. In other embodiments, rotating suctioning fin blades 42, back plate 45 and hub ring 47 may be affixed together. In some embodiments, back plate 45 is constructed to extract heat from output shaft 22 by conduction, e.g., through hub ring 47, and to transfer the heat to the environment 32 by convection. Rotating suctioning fin blades 42, fan 44, back plate 45 and hub ring 47 may be formed out of, for example, aluminum, e.g., 6000 series aluminum, although other types of aluminum and/or other materials may be employed in other embodiments. Fan 44, e.g., an inlet or intake portion of fan 44, is in fluid communication with an outlet 46 of scavenge scoop 24.

Output shaft 22 is operative to rotate fan 44. Fan 44 is constructed to, when rotated, generate a suction pressure acting on outlet 46 of scavenge scoop 24, drawing air through scavenge scoop 24. The air is received in inlet 40 of scavenge scoop 24. Scavenge scoop 24 guides the air across a portion of external surface 14 in the vicinity of end 38, inward (e.g., radially inward) and across side 30 of gearbox 12, and then radially outward through fan 44, along rotating suctioning fin blades 42 and back plate 45, providing convection cooling to side 30, and also extracting heat by convection from rotating suctioning fin blades 42 and back plate 45. In some embodiments, scavenge scoop 24 is configured to entrain additional cooling airflow from the environment 32 surrounding gearbox 12.

Figure 8:
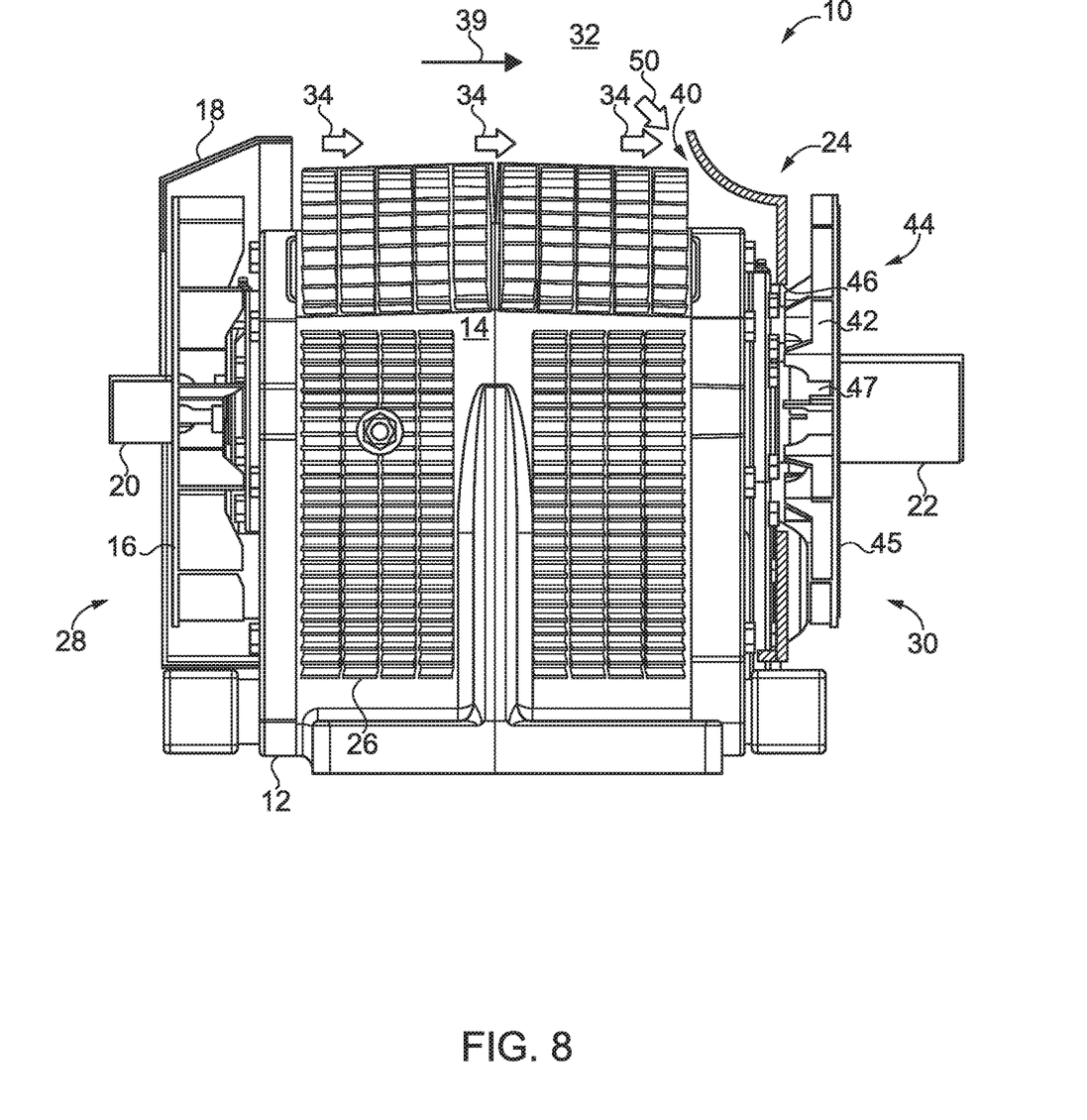
FIG. 8 illustrates some aspects of a non-limiting example of a machine system in accordance with an embodiment of the present invention.

Referring also to FIG. 8, some aspects of a non-limiting example of another embodiment of machine system 10 are illustrated in accordance with an embodiment of the present invention. The embodiment of FIG. 8 includes, like the embodiment of FIGS. 5-7, a plurality of rotating suctioning fin blades 42 are constructed to form fan 44. As with the embodiment of FIGS. 5-7, fan 44 includes back plate 45 and hub ring 47. Fan 44 is in fluid communication with outlet 46 of scavenge scoop 24. Output shaft 22 is operative to rotate fan 44. Fan 44 is constructed to, when rotated, generate a suction pressure acting on outlet 46 of scavenge scoop 24, drawing air through scavenge scoop 24. The air is received in inlet 40 of scavenge scoop 24. In the embodiment of FIG. 8, inlet 40 of scavenge scoop 24 is convex toward external surface 14 (and cooling fins 26 for embodiments so equipped), i.e., includes a convex inlet portion 48. In the embodiment of FIG. 8, scavenge scoop 24 is constructed scoop is constructed, e.g., via convex inlet portion 48, to entrain additional cooling airflow 50 from the environment 32 in which gearbox 12 is located. In particular, scavenge scoop 24 is constructed, e.g., via convex inlet portion 48, to entrain additional cooling airflow 50. For example, additional cooling airflow 50 is entrained by the cooling airflow 34 stream into inlet 40. Scavenge scoop 24 guides the air (cooling airflow 34 and additional cooling airflow 50) across a portion of external surface 14 in the vicinity of end 38, inward (e.g., radially inward) and across side 30 of gearbox 12, and then radially outward through fan 44, along rotating suctioning fin blades 42 and back plate 45, providing convection cooling to side 30, and also extracting heat by convection from rotating suctioning fin blades 42 and back plate 45. Additional cooling airflow 50 is cooler than cooling airflow 34, e.g., because it has not absorbed heat from external surface 14 (and cooling fins 26, for embodiments so equipped). The combination of cooling airflow 34 and additional cooling airflow 50 is thus cooler than cooling airflow 34, and thus provides greater cooling to gearbox 12 than embodiments wherein cooling airflow 34 is not used to entrain additional cooling airflow 50.

Embodiments of the present invention include a system, comprising: a machine having an external surface and a first shaft extending from a first side of the machine; a cooling airflow generator mounted on the shaft and operative to generate a cooling airflow; a flow guide structure in fluid communication with the cooling air generator and constructed to receive the cooling airflow from the cooling airflow generator and to direct the cooling airflow across the external surface; and a scavenge scoop spaced apart from the flow guide structure and disposed at a second side of the machine opposite the first side, wherein the external surface is disposed between the scavenge scoop and the flow guide structure, and wherein the scavenge scoop is constructed to collect a portion of the cooling airflow generated by the cooling airflow generator and direct the portion of the cooling airflow across a portion of the second side of the machine.

In a refinement, the external surface has a first end disposed proximate to the first side; wherein the flow guide structure is disposed proximate to the first end; wherein the external surface has a second end opposite the first end and disposed proximate to the second side; and wherein the scavenge scoop has an inlet disposed proximate to the second end of the external surface.

In another refinement, the inlet is constructed to collect the portion of the cooling airflow after the portion of the cooling airflow has passed over the external surface unbounded and cooled the external surface.

In yet another refinement, the inlet is convex toward the external surface.

In still another refinement, the scavenge scoop is constructed to entrain additional cooling airflow from the environment in which the machine is located.

In yet still another refinement, the scavenge scoop is concave toward the external surface.

In a further refinement, the system further comprises a second shaft extending from the second side of the machine, wherein the second shaft is operative to rotate upon a rotation of the first shaft; and a plurality of rotatable suction fins in thermal engagement with the second shaft, wherein the second shaft is operative to rotate the plurality of rotatable suction fins; wherein the plurality of rotatable suction fins is constructed to generate a suction pressure acting on the scavenge scoop; and wherein the plurality of rotatable suction fins are operative to extract heat from the second shaft via conduction.

In a yet further refinement, the machine is a gear reducer; wherein the first shaft is an input shaft; and wherein the second shaft is an output shaft.

In a still further refinement, the rotatable suction fins are constructed to increase the convective surface area of the second shaft.

In a yet still further refinement, the surface includes a plurality of cooling fins.

Embodiments of the present invention include a system, comprising: a gearbox having an external surface and an input shaft extending from a first side of the gearbox; a fan or impeller coupled to the input shaft, the fan or impeller being operative to, when rotated by the input shaft, generate a cooling airflow; a shroud constructed to guide the cooling airflow from the fan or impeller and direct the cooling airflow across the external surface and extract heat from the external surface by convection; and a scavenge scoop spaced apart from the shroud and disposed at a second side of the gearbox opposite the first side and opposite the shroud, wherein the external surface is disposed between the scavenge scoop and the shroud, and wherein the scavenge scoop is constructed to collect a portion of the cooling airflow generated by the cooling airflow generator and to direct the portion of the cooling airflow across a portion of the second side of the gearbox.

In a refinement, the external surface has a first end disposed proximate to the first side; wherein the shroud is disposed proximate to the first end; wherein the external surface has a second end opposite the first end and disposed proximate to the second side; and wherein the scavenge scoop has an inlet disposed proximate to the second end of the external surface.

In another refinement, the inlet is constructed to collect the portion of the cooling airflow after the portion of the cooling airflow has passed over the external surface unbounded and cooled the external surface.

In yet another refinement, the inlet is convex toward the external surface.

In still another refinement, the scavenge scoop is constructed to entrain additional cooling airflow from the environment in which the gearbox is located.

In yet still another refinement, the scavenge scoop is concave toward the external surface.

In a further refinement, the system further comprises an output shaft extending from the second side of the gearbox, wherein the output shaft is operative to rotate in a proportion to a rotation of the input shaft; and a plurality of rotatable suction fins mounted on and in thermal engagement with the output shaft; wherein the plurality of rotatable suction fins are constructed to extract heat from the output shaft via conduction In a yet further refinement, the scavenge scoop has an outlet; wherein the plurality of rotatable suction fins are in fluid communication with the outlet and are constructed to, when rotated, generate a suction pressure acting on the outlet and drawing air through the scavenge scoop, across the second side and through the rotatable suction fins to provide convection cooling to the second side and the rotatable suction fins.

In a still further refinement, the gearbox is a gear reducer.

In a yet still further refinement, the rotatable suction fins are constructed to increase the convective surface area of the second shaft.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A system, comprising:
   a machine having an external surface, a first side, a second side, and a first shaft, the first shaft extending from the first side of the machine;
   a cooling airflow generator mounted on the first shaft and operative to generate a cooling airflow for cooling the machine;
   a flow guide structure in fluid communication with the cooling airflow generator and constructed to receive the cooling airflow from the cooling airflow generator and to direct the cooling airflow in a direction across the external surface; and
   a scavenge scoop spaced apart from the flow guide structure and disposed at the second side of the machine, the first side and the second side being opposite side walls of the machine, wherein the external surface is disposed between the scavenge scoop and the flow guide structure, and wherein the scavenge scoop is constructed to collect a portion of the cooling airflow generated by the cooling airflow generator that has flown across the exterior surface and redirect the portion of the cooling airflow across a portion of the second side of the machine.

2. The system of claim 1, wherein the external surface has a first end disposed proximate to the first side; wherein the flow guide structure is disposed proximate to the first end; wherein the external surface has a second end opposite the first end and disposed proximate to the second side; and wherein the scavenge scoop has an inlet disposed proximate to the second end of the external surface.

3. The system of claim 2, wherein the shroud is constructed to direct the cooling airflow in an axial direction across the external surface, wherein the inlet is constructed to collect the portion of the cooling airflow after the portion of the cooling airflow has passed over the external surface unbounded and cooled the external surface, and wherein the scavenge scoop is configured to redirect the cooling air flow collected by the inlet to flow in at least an inwardly radial direction across a portion of the second side of the gearbox.

4. The system of claim 2, wherein the inlet is convex toward the external surface.

5. The system of claim 1, wherein the scavenge scoop is constructed to entrain additional cooling airflow from the environment in which the machine is located.

6. The system of claim 1, wherein the scavenge scoop is concave toward the external surface.

7. The system of claim 1, wherein the external surface includes a plurality of cooling fins.

8. A system, comprising:
   a machine having an external surface and a first shaft extending from a first side of the machine;
   a cooling airflow generator mounted on the first shaft and operative to generate a cooling airflow for cooling the machine;
   a flow guide structure in fluid communication with the cooling airflow generator and constructed to receive the cooling airflow from the cooling airflow generator and to direct the cooling airflow in a direction across the external surface;
   a scavenge scoop spaced apart from the flow guide structure and disposed at a second side of the machine opposite the first side, wherein the external surface is disposed between the scavenge scoop and the flow guide structure, and wherein the scavenge scoop is constructed to collect a portion of the cooling airflow generated by the cooling airflow generator and redirect the portion of the cooling airflow across a portion of the second side of the machine; and
   a second shaft extending from the second side of the machine, wherein the second shaft is operative to rotate upon a rotation of the first shaft; and a plurality of rotating suctioning fin blades in thermal engagement with the second shaft, wherein the second shaft is operative to rotate the plurality of rotating suctioning fin blades; wherein the plurality of rotating suctioning fin blades is constructed to generate a suction pressure acting on the scavenge scoop; and wherein the plurality of rotating suctioning fin blades are operative to extract heat from the second shaft via conduction.

9. The system of claim 8, wherein the machine is a gear reducer; wherein the first shaft is an input shaft; and wherein the second shaft is an output shaft.

10. The system of claim 8, wherein the rotating suctioning fin blades are constructed to increase the convective surface area of the second shaft.

11. A system, comprising:
a gearbox having an external surface, an input face, an output face, and an input shaft, the input shaft extending from the input face of the gearbox, the external surface being positioned between the input face and the output face;
a fan or impeller coupled to the input shaft, the fan or impeller being operative to, when rotated by the input shaft, generate a cooling airflow;
a shroud constructed to guide the cooling airflow from the fan or impeller and direct the cooling airflow in an axial direction across the external surface and extract heat from the external surface by convection; and
a scavenge scoop spaced apart from the shroud and disposed at the output face of the gearbox opposite the input face and opposite the shroud, wherein the external surface is disposed between the scavenge scoop and the shroud, and wherein the scavenge scoop is constructed to collect a portion of the cooling airflow that was directed in an axial direction across the external surface, and which was generated by the fan or impeller, and to redirect the portion of the cooling airflow in at least an inwardly radial direction across a portion of the output face of the gearbox.

12. The system of claim 11, wherein the external surface has a first end disposed proximate to the input face; wherein the shroud is disposed proximate to the first end; wherein the external surface has a second end opposite the first end and disposed proximate to the output face; and wherein the scavenge scoop has an inlet disposed proximate to the second end of the external surface.

13. The system of claim 12, wherein the inlet is constructed to collect the portion of the cooling airflow after the portion of the cooling airflow has passed over the external surface unbounded and cooled the external surface.

14. The system of claim 12, wherein the inlet is convex toward the external surface.

15. The system of claim 11, wherein the scavenge scoop is constructed to entrain additional cooling airflow from the environment in which the gearbox is located.

16. The system of claim 11, wherein the scavenge scoop is concave toward the external surface.

17. A system, comprising:
a gearbox having an external surface and an input shaft extending from a first side of the gearbox;
a fan or impeller coupled to the input shaft, the fan or impeller being operative to, when rotated by the input shaft, generate a cooling airflow;
a shroud constructed to guide the cooling airflow from the fan or impeller and direct the cooling airflow in a direction across the external surface and extract heat from the external surface by convection;
a scavenge scoop spaced apart from the shroud and disposed at a second side of the gearbox opposite the first side and opposite the shroud, wherein the external surface is disposed between the scavenge scoop and the shroud, and wherein the scavenge scoop is constructed to collect a portion of the cooling airflow generated by the cooling airflow generator and to direct the portion of the cooling airflow across a portion of the second side of the gearbox; and
an output shaft extending from the second side of the gearbox, wherein the output shaft is operative to rotate in a proportion to a rotation of the input shaft; and a plurality of rotating suctioning fin blades mounted on and in thermal engagement with the output shaft; wherein the plurality of rotating suctioning fin blades are constructed to extract heat from the output shaft via conduction.

18. The system of claim 17, wherein the scavenge scoop has an outlet; wherein the plurality of rotating suctioning fin blades are in fluid communication with the outlet and are constructed to, when rotated, generate a suction pressure acting on the outlet and drawing air through the scavenge scoop, across the second side and through the rotating suctioning fin blades to provide convection cooling to the second side and the rotating suctioning fin blades.

19. The system of claim 17, wherein the gearbox is a gear reducer.

20. The system of claim 17, wherein the rotating suctioning fin blades are constructed to increase the convective surface area of the output shaft.

* * * * *